Patented Jan. 30, 1945

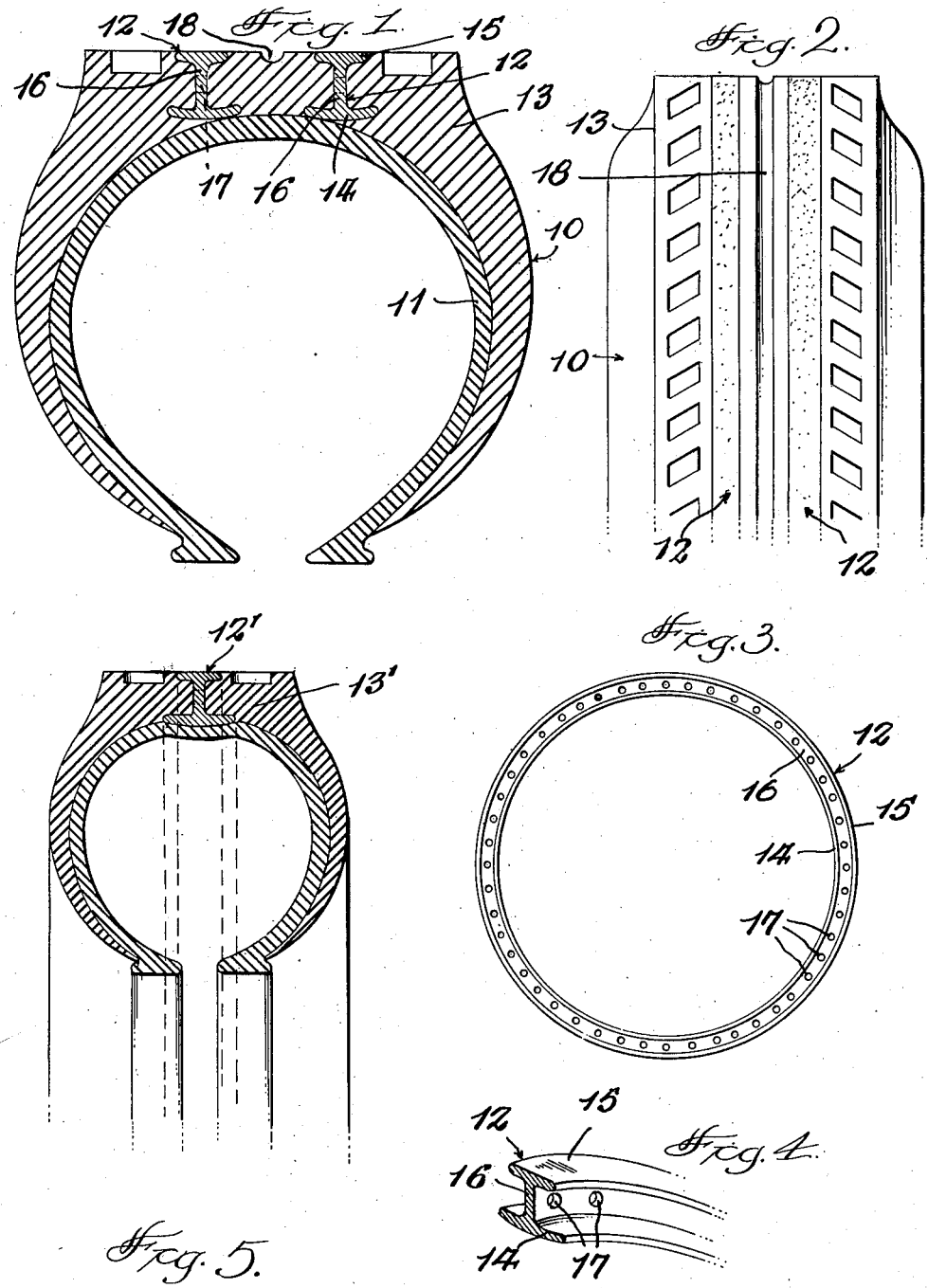

2,368,325

UNITED STATES PATENT OFFICE 2,368,325

TIRE CONSTRUCTION

Henry M. Renner, Fort Benning, Ga.

Application May 27, 1943, Serial No. 488,761

3 Claims. (Cl. 152—57)

This invention relates to pneumatic tires for motor vehicles and the like and it consists in the constructions, arrangements and combinations herein described and claimed.

It is the cardinal object of the invention to provide a pneumatic tire of a structure which will withstand unusual load weights and stresses, increase the life of the tire, yet retain as much, if not greater resiliences than the ordinary vehicle tire.

More specifically, it is an object of the invention to provide a pneumatic tire casing in which an annular steel tread or treads are embedded integrally within the rubber tread of a tire, and having a portion exposed for traction purposes, the tread or treads occupying a position medially of the tire.

It is also an important object of the invention to provide a novel construction of tread enabling its ready and permanent securement within the tread of a tire after once being molded therein.

Additional objects, advantages and features of invention will be apparent from the following description, considered in conjunction with the accompanying drawing, wherein, Figure 1 is a cross section of a tire constructed in accordance with my invention, Figure 2 is a reduced fragmentary elevation of the tire.

Figure 3 is a plan view of a traction band employed in the construction of the tire.

Figure 4 is a fragmentary cross section, in perspective, of the traction band.

Figure 5 is a cross section of a modified form of the tire.

Reference is first made to Figures 1 and 2 of the drawing, wherein there is shown a pneumatic tire 10 consisting of a fabric or cord carcass 11 as customarily constructed for use in tires of conventional form.

The present construction of tire is for heavy duty use, particularly trucks, tractors and the like, and therefore a pair of annular steel traction treads 12 are employed, embedded within the rubber tread body 13.

The treads 12 are substantially I-shaped as seen in cross section, having a broad base 14 and a narrower tread face 15, the base and face being integrally connected by a flange 16, medially of their widths. As clearly shown in Figures 3 and 4, the flange 16 is formed with a multiplicity of apertures 17 spaced circumferentially thereof, and these together with the base 14 afford a secure incorporation within the tire tread 13. It will be noted that the base 14 of the tread is slightly arcuate shaped, this form tending to also retain the tread firmly within the tread body.

The carcass 11 may be built up as usual of fabric or cords, or both, as desired, the steel treads 12 and the carcass 11 are now placed in a suitable mold, the arcuate bases 14 contacting the outer layer of fabric or cord. The treads 12 are suitably spaced apart and retained, and when the rubber compound is placed in the tire mold, the compound will flow in and around the treads 12 and through the apertures 17 thereof. The tread design of the mold will include a circumferential medially positioned bead for the formation of a central flexing groove 18 of the tire tread, which it will be noted is positioned between the treads 12.

The overall height of the traction treads will vary according to the size of the tire to be constructed, but in all cases, the tread face 15 will stop flush with the outermost surface of the tread body 13.

In Figure 5, a modification of the tire is shown, a construction which is suitable for light cars and trucks. The construction is identical with that just described, except that a single traction tread 12' is employed, which in this instance, is positioned centrally of the tread body 13'.

A tire constructed in accordance with the present invention will provide a tire of long use, since the metallic treads 12 and 12' will absorb much of the wear which the tread body 13 or 13' would ordinarily receive and in addition, the treads lend stability to the tire as a whole, and will lessen side wall breakage in the case of excessive loads or under inflation of the tire.

While I have shown and described certain preferred forms of the tire, this is by way of illustration only, and I consider as my own all such modifications in construction as fairly fall within the scope of the appended claims.

1. In a pneumatic tire, a carcass and tread bonded together, spaced apart annular metallic tread members embedded within the tread and lying flush with the outer surface of the tread, said metallic treads each consisting of a broad arcuate-shaped base and a narrower traction face, said base and traction face being integrally connected by a medial continuous flange, said flange having a multiplicity of apertures therethrough to effect anchorage with the material of said tread, and said tread having an annular flexing groove between said metallic tread members.

2. In a pneumatic tire, a carcass and tread bonded together, an annular auxiliary metallic tread member embedded within the tread and terminating flush with the outer surface of said tread, said metallic tread consisting of a broad arcuate-shaped base and a narrower traction face, said base and traction face being integrally connected by a medial continuous flange and said flange having a multiplicity of apertures therethrough to effect anchorage with the material of said tread.

3. In a pneumatic tire, a carcass and tread bonded together and spaced apart annular metallic tread members embedded within the tread and lying flush with the outer surface of said tread, said metallic treads each consisting of a broad base and a narrow traction face, said base and traction face being integrally connected by a medially located continuous flange, said base being arcuate-shaped and said flange being provided with a plurality of circumferentially spaced apertures.

HENRY M. RENNER.